United States Patent [19]

Rademacher

[11] 4,387,797

[45] Jun. 14, 1983

[54] METHOD AND DEVICE FOR TRANSMITTING CROWN CORKS

[75] Inventor: Friedrich Rademacher, Kamen-Südkamen, Fed. Rep. of Germany

[73] Assignee: Holstein und Kappert GmbH, Dortmund, Fed. Rep. of Germany

[21] Appl. No.: 176,573

[22] Filed: Aug. 8, 1980

[30] Foreign Application Priority Data

Aug. 9, 1979 [DE] Fed. Rep. of Germany ....... 2932339

[51] Int. Cl.[3] ........................ B65G 47/31; B65G 47/80

[52] U.S. Cl. ..................................... 198/461; 198/481

[58] Field of Search ................ 198/459, 461, 480–481, 198/803

[56] References Cited

U.S. PATENT DOCUMENTS 1,194,990 8/1916 Gaynor .......................... 198/803 X
1,689,247 10/1928 Lange ................................. 198/459
1,820,562 8/1931 Guenther ........................... 198/459

*Primary Examiner*—James G. Smith
*Assistant Examiner*—Douglas D. Watts
*Attorney, Agent, or Firm*—Toren, McGeady and Stanger

[57] ABSTRACT

Crown corks are conveyed from a supply source along an aligning track to a helically shaped guide track and then on to a capping device. A conveying disc rotates about a central axis and has a planar surface extending transversely of the central axis adjacent to the guide track. The conveying disc moves individual crown corks from the aligning track through the guide track to receiving pockets in the capping device. The receiving pockets travel along a circular path which has a transfer point disposed tangentially to the circumferential edge of the planar surface of the conveying disc.

6 Claims, 1 Drawing Figure

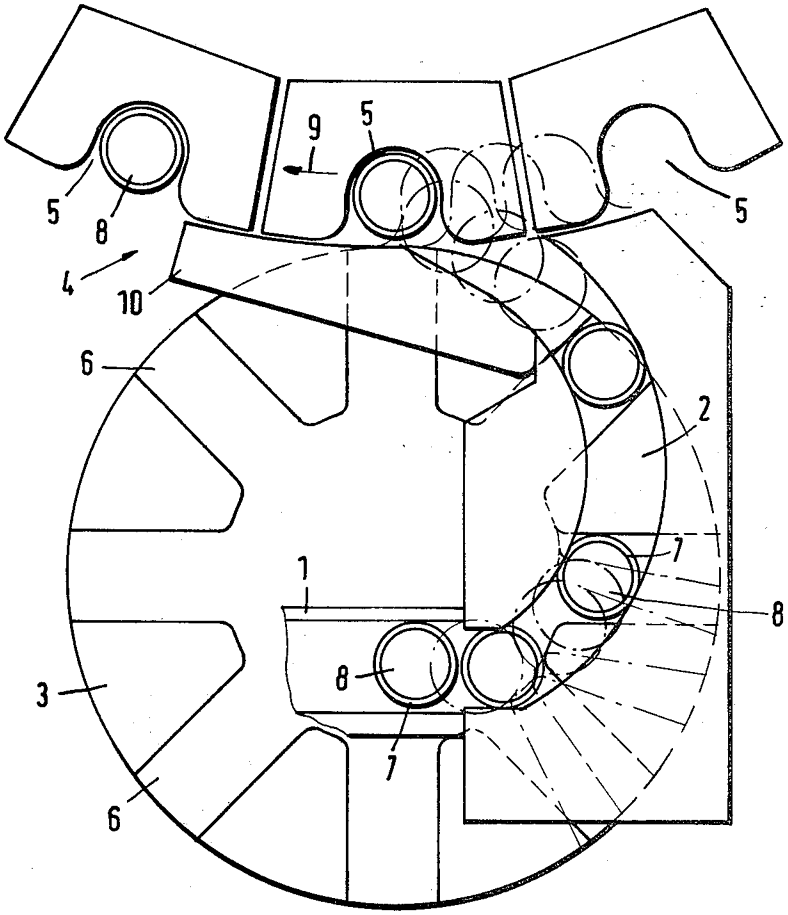
9
5
5
8
5
4
10
6
2
7
1
8
8
3
7
6

METHOD AND DEVICE FOR TRANSMITTING CROWN CORKS

SUMMARY OF THE INVENTION

The invention relates to a method and arrangement for the transfer of crown corks which are taken from a collecting container, are aligned and fed to a transfer station from where they are transferred into the receiving pockets of a rotating closing or capping device.

In the known arrangements, the crown corks, after their alignment, are ejected along a guide track radially to the axis of the closing turning circle into its receiving pockets. The required acceleration of the crown cork which is in the front at the moment is effected by an aimed air or water jet.

The acceleration by means of the admission of air is no longer acceptable for reasons of noise control technology. The admission of a water jet to the foremost crown cork is acceptable for reasons of noise control technology, however, this has the disadvantage that the entire machine becomes dirty, particularly due to the capping unit which rotates at a high speed. Moreover, the known radial feed of a crown cork allows only a certain efficiency; as a result, particularly in high-capacity machines, several transfer stations must be provided. Therefore, it has already been suggested to arrange a rotating disk between the end of the storing and aligning track and the receiving pocket of the capping unit. This rotating disk is equipped with appropriate receiving pockets and receives the crown cork emerging from the storing and aligning track and transfers the crown cork into the receiving pocket of the capping unit. Also in this arrangement, the crown corks are transferred and received in radial direction, so that the initially described disadvantages still exist.

The invention is based on the task of introducing the crown corks essentially tangentially into the receiving pocket of the capping unit, wherein the required spacing of the corks is to be effected while they are still in the extended guide track and wherein acceleration media, such as air and water, are not to be used.

In accordance with the invention, this task is solved in a method of the above-mentioned type thereby that, after entering the transfer station, the crown corks, arranged in a row, are continuously brought into a spacing along an essentially helical path, the spacing corresponding to that of the receiving pockets of the capping turning component. An arrangement suitable for carrying out the method, composed of a collecting container with subsequent sorting and aligning track and a transfer station reaching into the range of the receiving pockets, is distinguished by the fact that the transfer station is composed of a helically expanding, stationary guide track whose initial portion is directed tangentially with the outlet opening of the sorting and aligning track and whose end portion is arranged tangentially to the capping turning circle, and that a conveying disk with star-like directed webs and/or grooves corresponds with the guide track, and webs and/or grooves engaging in the path of movement of the crown corks and discharging the crown corks with the proper spacing to the receiving pockets.

Additional features in accordance with the invention result from the claims.

The method and the arrangement proposed in connection therewith provide a tangential transfer of the crown corks without having to use additional acceleration media. After leaving the aligning track, the crown corks are brought in a stationary guide track automatically due to its shape into the spacing which is given by the number of receiving pockets in the capping turning circle. Simultaneously, it must be ensured that, when a receiving pocket is occupied by a crown cork which has not been removed during the preceding revolution, the next crown cork intended for this receiving pocket is automatically ejected, without causing damages to the crown corks or jams within the guide path.

In the following, the invention shall be explained in more detail with the aid of an embodiment which is illustrated in the drawing.

BRIEF DESCRIPTION OF THE DRAWING

The drawing is a schematic showing of an apparatus embodying the present invention.

DETAILED DESCRIPTION OF THE INVENTION

In accordance with the embodiment illustrated in the drawing, the transfer station is composed of the end of a sorting and aligning track 1, a subsequent guide track 2 and a conveying disk 3. The guide track 2 is connected to the end of an aligning track 1 which leads to a collecting container, not shown in detail, and extends spirally to a capping unit 4. The latter is constructed in the shape of a circle and has receiving pockets 5 which are arranged equally spaced on the outer periphery. The guide track 2 is dimensioned in such a way that the upper, narrow cap portion of a crown cork is guided therein. The conveying disk 3 is rotatably supported below the guide track 2. The plane or surface of the disk 3 facing toward the guide track 2 is equipped with star-like aligned grooves 6 that is, generally radially extending grooves, whose purpose it is to receive the widening lower portion 7 of a crown cork 8.

From the obliquely downwardly directed aligning track 1, the crown corks reach, as a result of the pressure built up in this track, the region of the guide track 2 and are automatically taken along by the raised portion at the end region of the groove 6, as shown in dash-dot lines, and, by sliding along the guide track 2, are continuously brought into the required spacing. As also illustrated by dash-dot lines, the crown cork 8, as soon as it has reached the end of the guide track 2 on the side of the capping unit, is tangentially transferred to the appropriately aligned receiving pocket 5.

In the illustrated embodiment, the side 10 of the end portion of the guide track 2 facing in the direction of rotation of the receiving pockets 5 according to arrow 9 is constructed so that it can swing out. As a result, when a receiving pocket 5 is occupied because a crown cork 8 had not been taken out, the next crown cork in the guide track 2 can be taken along out of the region of the receiving pocket by the groove 6 which continues to rotate, and can subsequently be ejected.

Instead of a swinging side 10, this region can also be formed by a plate spring or the like at the end of the guide track, which spring also makes it possible that the crown cork can move out of the way.

The arrangement of the conveying disk 3 in accordance with the illustrated embodiment is not binding. For example, it is conceivable to arrange the disk above the guide track 2, wherein the crown cork is placed in the guide track 2 with its greater diameter and the smaller diameter is guided by appropriate grooves or webs in the conveying disk 3.

I claim:

1. Method of transferring crown corks to a capping device comprising the steps of moving the crown corks along an aligning track to the rectilinearly extending outlet end thereof, removing individual crown corks from the rectilinearly extending outlet end of the aligning track and conveying the individual crown corks along a horizontal stationary spirally extending track and supporting opposite sides of the crown corks by opposite sides of the spirally extending track, supporting the crown corks within the spirally extending track on a horizontal surface generally parallel to the spirally extending track which is located in a single horizontal plane, supporting the opposite sides of the crown cork and rotating the supporting surface about a central axis spaced from the spirally extending track, guiding the crown corks on the rotating supporting surface between generally radially outwardly extending surfaces thereon relative to the central axis, moving the crown corks individually through the spirally extending track by the rotational movement of the surface relative to the stationary spirally extending track while guiding the crown corks between the radially outwardly extending surfaces and increasing the spacing between the individual crown corks as they are conveyed along the spirally extending track, moving the capping device along a circular path and providing angularly spaced receiving pockets in the capping device with the receiving pockets moving along the circular path, arranging the outlet end of the spirally extending track approximately tangentially of the circular path of the receiving pockets in the capping device, and introducing the individual crown corks from the spirally extending track each into an individual receiving pockets in the capping device.

2. Arrangement for transferring crown corks from a supply source to a capping location comprising a capping device movable along a circular path and having individual receiving pockets spaced angularly apart along the circular path, means forming an aligning track and arranged for moving a row of crown corks from the supply source to a rectilinearly extending outlet opening from said aligning track, means forming a horizontally arranged stationary spirally extending shaped guide track located in a single plane for receiving individual crown corks from the outlet opening of said aligning track and for guiding the crown corks individually and in spaced relation to the receiving pockets in said capping device, a horizontally arranged rotatable conveying disk vertically spaced from said guide track and having a central axis of rotation and a conveying surface extending radially outwardly from and transversely of the central axis, said conveying surface having a circular circumferential periphery, said rectilinearly extending outlet opening spaced between said central axis and said circumferential periphery, said conveying disk having generally radially outwardly extending guide surfaces extending to the circumferential periphery and arranged to engage the crown corks for adjusting the spacing of the crown corks, said conveying surface arranged to rotate passing in a plane generally parallel and adjacent to the plane of said guide track so that said conveying surface contacts the crown corks in said guide track and moves the crown corks individually along said guide track from said aligning track to said capping device and at the same time adjusting the spacing of the crown corks to correspond to the spacing of the receiving pockets in said capping device.

3. Arrangement, as set forth in claim 2, wherein said guide track has an inlet end for receiving crown corks from the aligning track and an outlet end for transferring crown corks to the receiving pockets in said capping device, said inlet end is arranged tangentially of the outlet opening from said aligning track and said outlet end is arranged approximately tangentially of the circular path of said capping device and is located at the circumferential periphery of said conveying surface.

4. Arrangement, as set forth in claim 2, wherein the point of contact of said conveying surface of said conveying disk moves generally outwardly away from the central axis of said conveying disk as said conveying disk moves the individual crown corks through said guide track to said capping device.

5. Arrangement, as set forth in claim 2, wherein said guide surfaces on said conveying surface of said conveying disk comprises a plurality of generally radially extending grooves formed thereon with the radially inner ends of said grooves spaced outwardly from the central axis of said conveying disk and the radially outer ends of said grooves located on the radially outer circumferential periphery of said conveying disk.

6. Arrangement, as set forth in claim 2, wherein said aligning track extends obliquely downwardly relative to said conveying surface on said conveying disk.

* * * * *